July 17, 1962
H. GOLDE
3,044,825
CONNECTING MEANS FOR A GUIDE RAIL FOR SLIDABLE ROOFS OF VEHICLES
Filed April 18, 1960
2 Sheets-Sheet 1
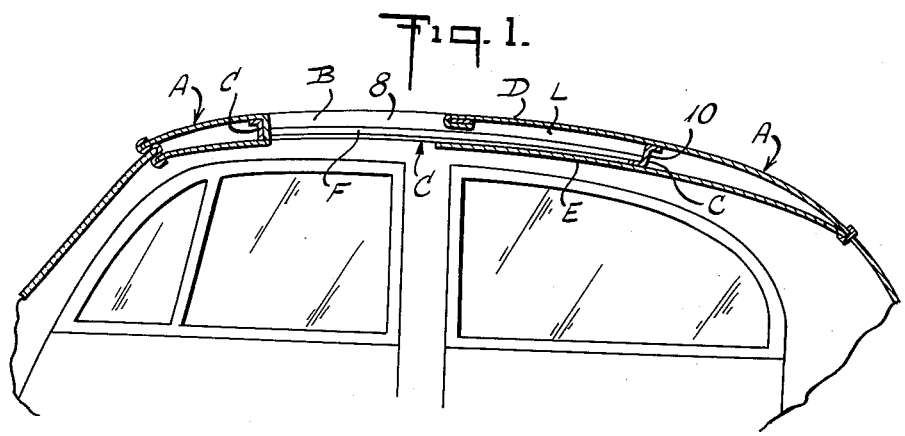
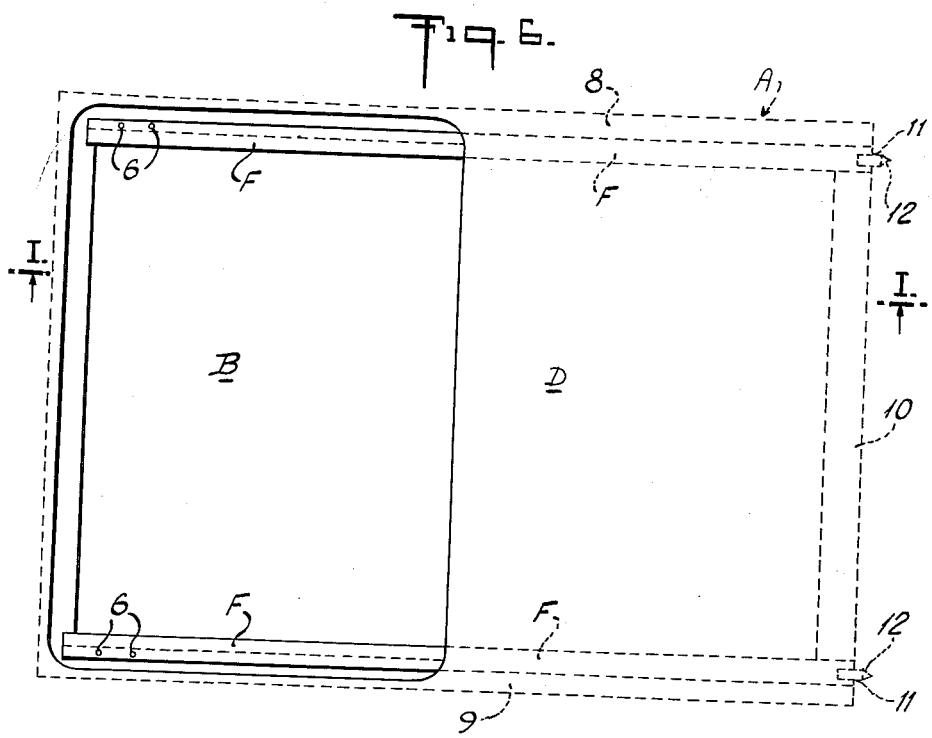
INVENTOR.
HANS GOLDE
BY
Nolte & Nolte
ATTORNEYS

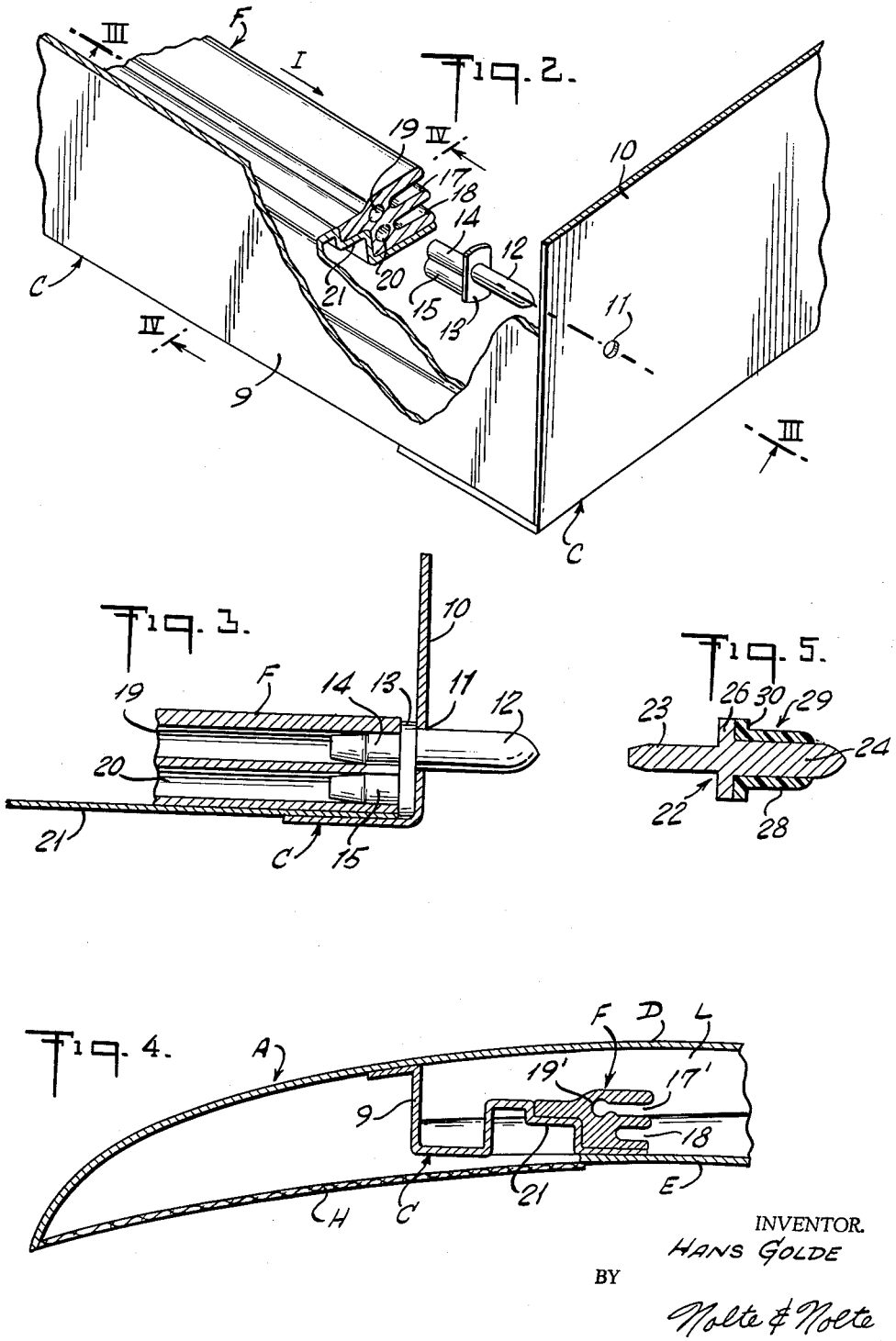

United States Patent Office 3,044,825
Patented July 17, 1962

3,044,825
CONNECTING MEANS FOR A GUIDE RAIL FOR SLIDABLE ROOFS OF VEHICLES
Hans Golde, Frankfurt am Main, Germany, assignor to H. T. Golde G.m.b.H. & Co., K.G., Frankfurt am Main, Germany
Filed Apr. 18, 1960, Ser. No. 22,882
Claims priority, application Germany May 2, 1959
7 Claims. (Cl. 296—137)

This invention relates to a vehicle roof.

When assembling vehicle roofs which have respective sliding roof parts, after the insertion of the frame of the sliding roof it has been found difficult to connect the guide rails to the frame. Particularly difficult in this respect are the mounting and fastening of the rear ends of the guide rails, since those ends extend into an inaccessible box-like part of the vehicle roof. That box-like part has an open front end and is bounded above by the fixed roof part, below by the fixed interior lining, and at the sides and at the rear by the frame of the sliding roof.

According to the present invention, there is provided a vehicle roof, comprising a fixed roof part, portions of said fixed roof part defining an aperture therein, first and second co-extensive parallel guide rails disposed on opposite sides of said aperture and extending beneath said fixed roof part beyond a further side of said aperture, for guiding a sliding roof part between a closed position in which said sliding roof part closes said aperture and an open position in which said sliding roof part is situated at least partly beneath said fixed roof part, a frame part extending from adjacent one end face of the first guide rail, which face is remote from the side of said aperture opposite said further side, to adjacent the corresponding end face of the second guide rail, portions of said frame part defining two holes therein adjacent the respective above-mentioned end faces, and two pin means projecting from the respective above-mentioned end faces and fitting into the respective holes.

In order that the invention may be clearly understood and readily carried into effect, reference will now be made, by way of example, to the accompanying drawings, in which:

FIGURE 1 shows, in particular, a schematic longitudinal vertical sectional view through a vehicle roof, FIGURE 2 shows an exploded perspective view, from above, of a portion of the roof shown in FIGURE 1, drawn to a larger scale, parts being cut away for ease of illustration, FIGURE 3 shows an unexploded vertical sectional view through the portion shown in FIGURE 2, the section being taken on the line III—III in FIGURE 2, FIGURE 4 shows part of a transverse vertical sectional view through a modified version of the roof shown in FIGURE 1, the line of section corresponding to the line IV—IV in FIGURE 2, FIGURE 5 shows a longitudinal section through a portion of the modified version of FIGURE 4, and FIGURE 6 represents a top plan view of the vehicle roof illustrated in FIGURES 1 through 4.

Referring to the drawings, the vehicle roof includes a fixed roof part A having formed therein an aperture B. First and second, parallel guide rails F are disposed on opposite sides of the aperture and extend beneath the fixed roof part A beyond the rear side of the aperture. The guide rails are arranged to guide a sliding roof part (not shown) between a closed position in which the sliding roof part closes the aperture and an open position in which the sliding roof part is situated at least partly beneath the fixed roof part. Connected fast to the fixed roof part and supporting the guide rails is a frame C for the sliding roof, the frame including a frame part 10 which is situated rearwards of the aperture and adjacent the rear ends of the guide rails, and which extends transversely to the longitudinal direction of the vehicle roof. The frame part 10 has formed therein two holes 11 adjacent the respective rear end faces of the guide rails, and there being two pins 12 (as shown in FIGURE 2) projecting from the rear end faces of the respective guide rails F and fitting into the respective holes 11 in the frame part 10. Parts 8 and 9 together with the frame part 10 and a portion D of the fixed roof part A, and a portion E of a fixed interior lining, provide a box-like part L open at the front end, the guide rails F extending into this box-like part. In some places, instead of the fixed interior lining portion E, an interior lining H of fabric can be used.

The top plan view of FIGURE 6 shows the two guide rails F connected to the frame part 10 and their location in relation to the aperture B. Both guide rails F are shown with their associated pins 12 protruding from the holes 11 of the frame part 10.

Referring particularly to FIGURES 1 through 3, the free end of each pin 12 is pointed and, in this case, is conically shaped, each hole 11 being so dimensioned that the relevant pin 12 closely fits therein. Each pin 12 can either be fixed to a flange-like base plate 13 or can be made integral therewith. Each base plate 13 extends in a plane at right-angles to the axis of the associated pin 12, and carries, at its side remote from the pin 12, two further pins 14 and 15 the free ends of which are frusto-conical and the axes of which are, respectively, co-incident and parallel with the axis of the associated pin 12. Each connecting member consisting of elements 12—15 can be made of metal, plastic or some other suitable material.

The guide rails F can be shaped in any appropriate manner, and, in the present case, are mainly of an E-shaped section known per se. Approximately at the same height as channels 17 and 18 in the E-shaped section, there are provided in the web of each guide rail F two longitudinal bores 19 and 20 which can extend the whole length of the guide rail and can be formed during an extrusion process. The diameter of the two pins 14 and 15 of each connecting member is so chosen that these pins can be inserted and held in the bores 19 and 20 of the associated guide rails F.

During construction of the roof, the frame C is connected to the fixed roof part A before the guide rails F are fixed to the frame C. When the pins 14 and 15 have been inserted in the bores 19, 20 of the associated guide rail F, the latter is pushed rearwards through the aperture B along the sliding roof frame C and in the direction of the arrow I (FIGURE 2) until the pin 12 engages the relevant hole 11 of the rear transverse frame part 10. The hole 11 is so arranged that the guide rail F when in its end position (see FIGURE 3) bears tightly against a shaped portion 21 forming part of the frame C and extending in the longitudinal direction of the roof. After insertion of the pins 12 into the respective holes 11, the rails F can be fixed to the frame C at readily accessible locations in the region of the aperture B, in a simple manner, for example by means of screws or rivets as shown at 6 in FIG. 6.

It will be seen that a particular advantage is afforded in that the lengths of the rails F on the one hand and of the frame C on the other hand do not need to correspond exactly (as shown), because the rails can be somewhat shorter than shown, the gap due to the difference in lengths being bridged by the pins 12.

Referring to FIGURES 4 and 5, each connecting member, in this case referenced 22, is inserted and gripped in a single short bore 19' which communicates for its whole length with an upper channel 17' of the associated E-section guide rail F. Rails of this configuration are simpler to manufacture than are rails of the cross-section shown in FIGURE 2.

The connecting member 22 is shown in FIGURE 5 and consists essentially of two co-axial pins 23 and 29 projecting from opposite sides of a flange 26 which extends in a plane at right-angles to the axes of the pins. The pin 29 consists of a sleeve 28 of thermo-plastic material and a metal core 24. The pin 23, the core 24 and the flange 26 are formed integral one with another. The cross-section of the pin 23 is adapted to that of the bore 19' in the associated rail F, and, instead of the illustrated circular cross-section, it would be possible to make the bore 19' and the pin 23 of any other cross-section. Each thermoplastic sleeve 28 has a flange 30 abutting one side of the flange 26.

After the pins 23 have been inserted in the bores 19', the rails F are slid rearward along the roof frame C, and the pins 29 are pushed into the holes 11 of the frame part 10, the pins 29 having some slight play in the holes, but the thermo-plastic covering 28 and 30 preventing rattling noises during travel of the vehicle.

The connecting member 22 could, alternatively, be made entirely of synthetic thermo-plastic material.

I claim:
1. A vehicle roof comprising a fixed roof part, portions of said fixed roof part defining an aperture therein having four sides, a pair of guide rails adapted for slidable insertion through said aperture beneath and along said fixed roof part and for disposal along two opposite ones of said sides so as to extend from a third side beyond a fourth side of said aperture, said two opposite sides being substantially parallel to the longitudinal extension of said vehicle roof, a sliding roof part supported by and displaceable along said rails between a closed position in the proximity of said third side and an open position in the proximity of said fourth side and at least partly beneath said fixed roof part, a frame part attached to said fixed roof part adjacent the end faces of said rails remotest from said third side, portions of said frame part defining holes wherein facing said end faces, and coupling means adapted to be attached to, projecting from said end faces and fitting snugly into respective ones of said holes of the frame part.

2. A vehicle roof as set forth in claim 1, wherein each of said coupling means comprises a pin substantially aligned with but extending in a direction opposite said holes, portions of each of said rails define therein a bore substantially parallel to said longitudinal extension, and said pins matingly engage a respective one of said bores upon said insertion of the rails.

3. A vehicle roof as set forth in claim 2, wherein said coupling means are removably attached to said end faces, further comprising flanges formed integral with and extending substantially at right angles from said coupling means and said pins, the latter being secured to said flanges.

4. A vehicle roof as set forth in claim 3, wherein said coupling means comprise at least one sleeve made of thermoplastic material for frictional engagement with said holes.

5. A vehicle roof as set forth in claim 2, wherein said rails have a substantially E-shaped cross section and each of said rails is formed with a longitudinal channel, said bores being provided adjacent the bases of said channels.

6. A vehicle roof as set forth in claim 5, wherein said channels have restricted lengthwise openings narrower than said pins, said bores form part of said channels, and said pins engage said part of the channels formed by said bores.

7. A vehicle roof as set forth in claim 5, wherein each of said rails has another longitudinal channel, portions of each of said rails define therein a second bore adjacent the base of said other channel, and each of said coupling means comprises a second pin engaging said second bore.

References Cited in the file of this patent

UNITED STATES PATENTS

| 1,267,390 | Dyke | May 28, 1918 |
| 2,007,865 | King | July 9, 1935 |

FOREIGN PATENTS

| 727,167 | Great Britain | Mar. 30, 1955 |